United States Patent [19]

Arora et al.

[11] Patent Number: 5,643,976

[45] Date of Patent: *Jul. 1, 1997

[54] SELF-DISPERSING CURABLE EPOXY RESIN DISPERSIONS AND COATING COMPOSITIONS MADE THEREFROM

[75] Inventors: Kartar S. Arora, Chalfont; Michael S. Wiggins, Lansdale, both of Pa.

[73] Assignee: Henkel Corporation, Plymouth Meeting, Pa.

[*] Notice: The portion of the term of this patent subsequent to Jun. 1, 2015, has been disclaimed.

[21] Appl. No.: 366,189

[22] Filed: Dec. 29, 1994

[51] Int. Cl.$^6$ .................................................. C08K 3/20
[52] U.S. Cl. .................... 523/404; 523/415; 525/484; 525/495; 525/504; 525/524; 525/528
[58] Field of Search .................................. 528/110, 111, 528/119, 121, 124; 560/166; 523/404, 415; 525/484, 495, 504, 524, 528

[56] References Cited

U.S. PATENT DOCUMENTS

| | | | |
|---|---|---|---|
| 2,651,589 | 9/1953 | Shokal et al. | 154/140 |
| 2,705,223 | 3/1955 | Renfrew et al. | 260/18 |
| 2,811,495 | 10/1957 | Wittcoff et al. | 260/18 |
| 2,864,775 | 12/1958 | Newey | 260/2 |
| 2,899,397 | 8/1959 | Aelony et al. | 260/18 |
| 3,249,412 | 5/1966 | Kolek et al. | 65/3 |
| 3,301,804 | 1/1967 | Zors et al. | 260/29.2 |
| 3,366,600 | 1/1968 | Haberliin et al. | 260/47 |
| 3,515,698 | 6/1970 | Mauz et al. | 260/75 |
| 3,538,184 | 11/1970 | Heer | 260/830 |
| 3,547,881 | 12/1970 | Mueller et al. | 260/47 |
| 3,634,348 | 1/1972 | Carter et al. | 260/18 |
| 3,639,344 | 2/1972 | Kinnemah et al. | 260/47 |
| 3,931,109 | 1/1976 | Martin | 260/47 |
| 4,031,050 | 6/1977 | Jerabek | 260/29.2 |
| 4,033,917 | 7/1977 | Sekmakas et al. | 260/29.2 |
| 4,093,594 | 6/1978 | Anderson | 260/47 |

(List continued on next page.)

OTHER PUBLICATIONS

Encyclopedia of Polymer Science and Technology, 1967, p. 226.

"Water–Reducible Coatings via Epoxy Resin Modification with Jeffamine (Reg. TM) ED–2001 and Jeffamine (Reg TM) M–1000".

Technical literature of Synthron Inc., Morgantown, North Carolina.

"Jeffamine®Polyoxypropyleneamine Curing Agents for Epoxy Resins", Texaco Chemical Company.

"Advanced Amine Technology for Superior Polymers", Texaco Chemical Company, 1992.

H. Lee and K. Neville, "Epoxy Polymers," *Encyclopedia of Polymer Science and Technology*, vol. 6, pp. 209–271, John Wiley and Sons, Inc., 1967.

*Encyclopedia of Polymer Science and Engineering*, John Wiley and Sons, New York, NY, vol. 6, pp. 340–361.

W.C. Griffith, "Emulsions", *Encyclopedia of Chemical Technology*, vol. 8, pp. 900–930, John Wiley and Sons, New York, NY, 1979.

Wicks, Z.W., Jr., Jones, F.N., Pappas, S.P., *Organic Coatings: Science and Technology, Volume II, Application Properties and Performance*, John Wiley & Sons, Inc., NY, 1994, pp. 42–45.

E. Hafslund, "Distillation", *Encyclopedia of Chemical Technology*, vol. 7, pp. 849–891, John Wiley and Sons, New York, NY, 1979.

F. Standiford, "Evaporation", *Encyclopedia of Chemical Technology*, vol. 9, pp. 472–493, John Wiley and Sons, New York, NY, 1980.

*Primary Examiner*—John C. Bleutge
*Assistant Examiner*—Randy Gulakowski
*Attorney, Agent, or Firm*—Wayne C. Jaeschke; John Daniel Wood; Daniel S. Ortiz

[57] ABSTRACT

There is disclosed a self-dispersing curable epoxy resin composition comprising the addition product of reactants comprising (a) 1.0 reactive equivalent of an epoxy resin, (b) from about 0.40 to 0.95 reactive equivalents of a polyhydric phenol, and (c) from about 0.005 to 0.5 reactive equivalents of an amine-epoxy adduct comprising the addition product of reactants comprising 1.0 reactive equivalent of a polyepoxide and from about 0.3 to 0.9 reactive equivalents of a polyoxyalkyleneamine having the structural formula:

$$R_1-O-R_2-CH_2CH(R_3)-X-R_4-NH_2$$

wherein:

$R_1$ designates a monovalent organic radical selected from the group consisting of $C_1$ to $C_{12}$ aliphatic, alicyclic or aromatic hydrocarbons, and $R_2$ represents a polyoxyalkylene chain having the structural formula:

$$(CH_2-CH_2-O)_a-(CH_2-CH(R_5)-O)_b$$

wherein:

$R_5$ is a monovalent organic radical selected from the group consisting of $C_1$ to $C_4$ aliphatic hydrocarbons, 'a' designates a number of ethoxy groups ($CH_2-CH_2-O$), 'b' designates a number of monosubstituted ethoxy groups ($CH_2-CH(R_5)O$) where the substitution of one monosubstituted ethoxy group is independent from the substitution of any other monosubstituted ethoxy group in the polyoxyalkylene chain, the sum of 'a' and 'b' is equal to or greater than 10 but less than or equal to 200, and where the sequence of ethoxy and monosubstituted ethoxy groups within a polyoxyalkylene chain may be completely random and/or there may be blocks of ethoxy and/or monosubstituted ethoxy groups, and $R_3$ designates H or a monovalent organic radical selected from the group consisting of $C_1$ to $C_4$ aliphatic hydrocarbons.

$R_4$ designates aliphatic, cycloaliphatic or aromatic radical containing 6 to 18 carbon atoms and X is OC(O)NH.

19 Claims, No Drawings

U.S. PATENT DOCUMENTS

| | | | |
|---|---|---|---|
| 4,105,634 | 8/1978 | Hanson et al. | 526/65 |
| 4,113,684 | 9/1978 | Petrie | 260/29.2 |
| 4,116,900 | 9/1978 | Belanger et al. | 260/18 |
| 4,134,864 | 1/1979 | Belanger | 260/18 |
| 4,137,140 | 1/1979 | Belanger | 204/18 |
| 4,139,510 | 2/1979 | Anderson | 260/18 |
| 4,177,177 | 12/1979 | Vanderhoff et al. | 260/29.2 |
| 4,182,831 | 1/1980 | Hicks | 528/103 |
| 4,246,148 | 1/1981 | Shimp et al. | 260/18 |
| 4,315,044 | 2/1982 | Elmore et al. | 427/386 |
| 4,420,574 | 12/1983 | Moriarity et al. | 523/404 |
| 4,420,606 | 12/1983 | Waddill | 528/111 |
| 4,423,166 | 12/1983 | Moriarity et al. | 523/414 |
| 4,423,170 | 12/1983 | Waddill | 523/417 |
| 4,430,261 | 2/1984 | Schäfer et al. | 260/404.8 |
| 4,533,254 | 8/1985 | Cook et al. | 366/176 |
| 4,608,405 | 8/1986 | DeGooyer | 523/404 |
| 4,608,406 | 8/1986 | Williams et al. | 523/424 |
| 4,678,712 | 7/1987 | Elliot | 428/418 |
| 4,728,384 | 3/1988 | Goel | 156/307.3 |
| 4,738,995 | 4/1988 | Kooijmans et al. | 523/404 |
| 4,810,535 | 3/1989 | McCollum et al. | 427/410 |
| 4,824,927 | 4/1989 | Dobbelstein et al. | 528/88 |
| 4,835,225 | 5/1989 | Massingll, Jr. et al. | 525/481 |
| 4,883,830 | 11/1989 | Kitabatake et al. | 523/414 |
| 4,886,867 | 12/1989 | Lin et al. | 528/111 |
| 4,937,275 | 6/1990 | Kooijmas et al. | 523/404 |
| 4,992,516 | 2/1991 | Schipfer et al. | 525/526 |
| 5,026,743 | 6/1991 | Beresford et al. | 523/404 |
| 5,032,629 | 7/1991 | Hansen et al. | 523/414 |
| 5,034,434 | 7/1991 | Beresford et al. | 523/404 |
| 5,057,557 | 10/1991 | Treybig et al. | 523/404 |
| 5,059,293 | 10/1991 | Sugishima et al. | 204/181 |
| 5,118,729 | 6/1992 | Piechocki | 523/404 |
| 5,221,700 | 6/1993 | Gilbert et al. | 523/404 |
| 5,246,984 | 9/1993 | Darwen et al. | 523/404 |
| 5,262,465 | 11/1993 | Ott et al. | 523/415 |

SELF-DISPERSING CURABLE EPOXY RESIN DISPERSIONS AND COATING COMPOSITIONS MADE THEREFROM

FIELD OF THE INVENTION

The present invention relates to a method of making aqueous epoxy resin dispersions. The dispersions are useful in preparing coating compositions comprising the same.

BACKGROUND OF THE INVENTION

Epoxy resins have come into widespread use as components in coating compositions. Coatings which comprise cured epoxy resins are valued for their durability, chemical resistance, and excellent adhesion to a broad range of substrates. Particularly desirable from an environmental point of view are epoxy resins which may be applied to a substrate with either minimal or no release of volatile organic components. Toward this end, there has been much research directed to the development of aqueous dispersions and emulsions of epoxy resins.

One class of aqueous epoxy dispersions employs one or more additives, also known as dispersants or emulsifiers or surfactants, which are necessary to stabilize the epoxy resin in the dispersion or emulsion form. Representative examples include an aqueous epoxy dispersion as described in U.S. Pat. No. 3,301,804 (employing the reaction product of a boric acid ester derived from boric acid with both an alkylene glycol and a beta-dialkyl-substituted aminoalkanol as an emulsifier), U.S. Pat. No. 3,634,348 (employing a phosphate ester as an emulsifying agent), U.S. Pat. No. 3,249,412 (employing in combination a cationic emulsifying agent selected from the group consisting of imidazolines and amides and a noraionic emulsifying agent), and Specialty Chemicals Bulletin SC-021 titled "Water-Reducible Coatings via Epoxy Resin Modification with Jeffamine (Reg.™) ED-2001 and Jeffamine (Reg.™) M-1000" available from Texaco Chemical Company, Bellaire, Tx. Another example comes from the technical literature of Synthron Inc., Morgantown, N.C., which discloses the use of PROXO-E-141, a diglycidyl ether of Pluronic (Reg.™) F88 diol (an ethylene oxide—propylene oxide—ethylene oxide block copolymer available from BASF Performance Chemicals, Parsippany, N.J.) as a reactive dispersant for epoxy resins. PROX-E-141 can act as a dispersant for epoxy resin in water, but then will react along with the epoxy resin when exposed to an amine functional curing agent.

The use of an additive to provide stability to an aqueous epoxy dispersion is preferably avoided as such additives add additional cost, formulation complexity, and may potentially interfere with the performance of a coating derived from the aqueous epoxy dispersion.

It is known to prepare aqueous epoxy dispersions from self-emulsifying epoxy resins. For example, U.S. Pat. No. 4,315,044 describes a stable epoxy dispersion composition comprising (1) an aqueous medium; and (2) between about 50–70 weight percent of self-emulsifying epoxy resin which is the addition product of reactants comprising (a) 40–90 parts by weight of diglycidyl ether of dihydric phenol, (b) 5–35 parts by weight of dihydric phenol, and (c) 2–15 parts by weight of diglycidyl ether of polyoxyalkylene glycol, wherein the molecular weight of the epoxy resin is in the range between about 500–20,000. The dispersion can also contain 1–25 weight percent based on resin solids of a water-immiscible $C_8$–$C_{20}$ aliphatic monoepoxide reactive diluent.

U.S. Pat. No. 4,608,406 describes stable aqueous epoxy resin dispersions comprised of (1) an aqueous medium; and (2) between about 50 to about 70 weight percent of self-emulsifying epoxy resin which is the addition reaction product of (a) 40–90 parts by weight of a diglycidyl ether of a dihydric phenol; (b) 5–35 parts of a dihydric phenol; (c) 2–15 parts by weight of a diglycidyl ether of a polyoxyalkylene glycol; and (d) 2 to 15 parts by weight of an alkyl phenol-formaldehyde novolac resin wherein the molecular weight of the epoxy resin is in the range of about 1000 to about 20,000. The stable dispersions can be modified by the addition of about 1 to about 25 weight percent of an aliphatic monoepoxide reactive diluent.

In an attempt to improve freeze-thaw stability, the stable aqueous epoxy resin dispersions can be modified by the addition of about 5–20 weight percent, based on resin solids weight, of a water-miscible solvent which, preferably, is a 2 to 8 carbon glycol or glycol ether.

There remains a need for further improvements in terms of the freeze-thaw resistance of aqueous epoxy resin dispersions, and in terms of the corrosion resistance and chemical resistance of coatings derived from aqueous epoxy resin dispersions which are adapted for application as industrial maintenance coating systems.

Accordingly, it is a primary object of this invention to provide a self-dispersing curable epoxy resin which may be dispersed in water without the necessity for an additive to stabilize the epoxy dispersion.

Another object of this invention is to provide aqueous dispersions of self-dispersing curable epoxy resins which exhibit long term stability under ambient storage conditions.

Yet another object of this invention is to provide coating compositions incorporating a self-dispersing curable epoxy resin, where the coating composition exhibits excellent properties when cured.

Other objects and advantages of the present invention shall become apparent from the accompanying description and examples.

SUMMARY OF THE INVENTION

According to the present invention, we disclose a self-dispersing curable epoxy resin composition comprising the addition product of reactants comprising (a) 1.0 reactive equivalent of an epoxy resin, (b) from about 0.40 to 0.95 reactive equivalents of a polyhydric phenol, and (c) from about 0.005 to 0.5 reactive equivalents of an amine-epoxy adduct comprising the addition product of reactants comprising 1.0 reactive equivalent of a polyepoxide and from about 0.3 to 0.9 reactive equivalents of a polyoxyalkylene-aminocarbamate having the structural formula:

$$R_1-O-R_2-CH_2CH(R_3)-X-R_4-NH2$$

wherein:

$R_1$ designates a monovalent organic radical selected from the group consisting of $C_1$ to $C_{12}$ aliphatic, allcyclic or aromatic hydrocarbons, and $R_2$ represents a polyoxyalkylene chain having the structural formula:

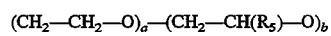

$$(CH_2-CH_2-O)_a-(CH_2-CH(R_5)-O)_b$$

wherein:

$R_5$ is a monovalent organic radical selected from the group consisting of $C_1$ to $C_4$ aliphatic hydrocarbons, 'a' designates a number of ethoxy groups ($CH_2-CH_2-O$), 'b' designates a number of monosubstituted ethoxy groups ($CH_2-CH(R_5)O$) where the substitution of one monosubstituted ethoxy group is independent from the substitution of any other monosubstituted ethoxy group in the polyoxyalkylene chain, the sum of 'a' and 'b' is equal to or greater than 10 but less than or equal to 200, and where the sequence of ethoxy and monosubstituted ethoxy groups within a polyoxyalkylene chain may be completely random and/or there may be blocks of ethoxy and/or monosubstituted ethoxy groups, and $R_3$ designates H or a monovalent organic radical selected from the group consisting of $C_1$ to $C_4$ aliphatic hydrocarbons, $R_4$ designates aliphatic, cycloaliphatic or aromatic radical containing 6 to 18 carbon atoms and X is OC(O)NH.

DETAILED DESCRIPTION OF THE INVENTION

The self-dispersing curable epoxy resin used as a starting material herein can by any one of several self-dispersing curable epoxy resins that are based upon a polyoxyalkyleneaminocarbamate (I).

In certain embodiments, the self-dispersing curable epoxy resin based on said polyoxyalkyleneaminocarbamate is prepared by reacting (a) 1.0 reactive equivalents of an epoxy resin, (b) from about 0.01 to 1.0 reactive equivalents (e.g. from about 0.4 to about 0.6 reactive equivalents or from about 0.65 to about 0.95 reactive equivalents) of a polyhydric phenol, and (c) from about 0.005 to 0.5 reactive equivalents of an amine-epoxy adduct, wherein the amine-epoxy adduct is formed upon contacting 1.0 equivalents of a polyepoxide and from about 0.3 and 0.9 reactive equivalents of a polyoxyalkyleneaminocarbamate (I). Such self-dispersing curable epoxy resins are similar to those described in detail in U.S. Ser. No. 08/255,732, filed Jun. 14, 1994 (now U.S. Pat. No. 5,565,505), the disclosure of which is incorporated herein by reference. The polyoxyalkyleneaminocarbamate (1) useful in the practice of the present invention is different from the monoprimary polyoxyalkylene amine capped with a hydrophobic hydrocarbon group disclosed in U.S. Pat. No. 5,565,505.

In other embodiments, the epoxy resin is prepared by reacting an epoxy resin with a polyoxyalkyleneaminocarbamate (I) having a molecular weight of from about 3,000 to about 15,000 in a ratio of about 0.001 to 0.060 reactive equivalents of polyoxyalkyleneamin ocarbamate (I) to about 1.0 reactive equivalents of epoxy resin. The polyoxyalkyleneaminocarbamate (1) used in the present invention is different from the hydrophobic hydrocarbon capped polyalkylene monoprimary amines known in the art.

In yet other embodiments, the epoxy resin composition is prepared by reacting (a) 1.0 reactive equivalents of an epoxy resin, (b) from about 0.005 to 0. 5 reactive equivalents of an amine-epoxy adduct, and optionally (c) from about 0.01 to 1.0 reactive equivalents of a polyhydric phenol, wherein the amine-epoxy adduct is formed upon contacting 1.0 equivalents of a polyepoxide with from greater than about 1.0 equivalents (preferably from about 1.01 to about 2.5) reactive equivalents of a polyoxyalkyleneamineocarbamate (I). The polyoxyalkyleneaminocarbamate used in the present invention is different from the hydrophobic hydrocarbon capped polyalkylene monoprimary amine containing no linking groups which are known.

The Polyoxyalkyleneaminocarbamate (I)

The polyoxyalkyleneaminocarbamate (I) reactant comprises one or more adducts of a monoether of polyoxyalkylenediol and a diisocyanate where the adduct comprises both amine groups and substantially water-soluble polyether chains. The polyoxyalkyleneamine (I) reactant is soluble or at least partially soluble in water.

Polyoxyalkyleneaminocarbamate (I) of this invention have the structural formula:

$R_1-O-R_2-CH_2CH(R_3)-X-R_4-NH_2$ wherein $R_1$ designates a monovalent organic radical selected from the group consisting of $C_1$ to $C_2$ aliphatic, alicyclic or aromatic hydrocarbons, and $R_2$ represents a polyoxyalkylene chain having the structural formula:

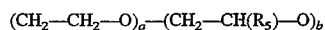
$(CH_2-CH_2-O)_a-(CH_2-CH(R_5)-O)_b$ wherein $R_5$ is a monovalent organic radical selected from the group consisting of $C_1$ to $C_4$ aliphatic hydrocarbons, 'a' designates a number of ethoxy groups $(CH_2-CH_2-O)$, 'b' designates a number of monosubstituted ethoxy groups $(CH_2-CH(R_5)-O)$ where the substitution of one monosubstituted ethoxy group is independent from the substitution of any other monosubstituted ethoxy group in the polyoxyalkylene chain, the sum of 'a' and 'b' is equal to or greater than 10 but less than or equal to 200, and where the sequence of ethoxy and monosubstituted ethoxy groups within a polyoxyalkylene chain may be completely random and/or there may be blocks of ethoxy and/or monosubstituted ethoxy groups, and $R_3$ designates H or a monovalent organic radical selected from the group consisting of $C_1$ to $C_4$ aliphatic hydrocarbons.

$R_4$ is an aliphatic, cycloaliphatic or aromatic group containing 6 to 18 carbon atoms and X is equal to OC(O) NH.

The polyoxyalkyleneaminocarbamate suitable for this invention can be obtained from monoethers of polyoxyalkylene diols and diisocyanates. Suitable mono ethers of polyoxyalkylenediols have the structural formula

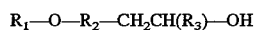
$R_1-O-R_2-CH_2CH(R_3)-OH$ wherein $R_1$ designates a monovalent organic radical selected from the group consisting of $C_1$ to $C_{12}$ aliphatic, alicyclic or aromatic hydrocarbons, and $R_2$ represents a polyoxyalkylene chain having the structural formula:

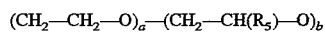
$(CH_2-CH_2-O)_a-(CH_2-CH(R_5)-O)_b$ wherein $R_5$ is a monovalent organic radical selected from the group consisting of $C_1$ to $C_4$ aliphatic hydrocarbons, 'a' designates a number of ethoxy groups $(CH_2-CH_2-O)$, 'b' designates a number of monosubstituted ethoxy groups $(CH_2-CH(R_5)-O)$ where the substitution of one monosubstituted ethoxy group is independent from the substitution of any other monosubstituted ethoxy group in the polyoxyalkylene chain, the sum of 'a' and 'b' is equal to or greater than 10 but less than or equal to 200, and where the sequence of ethoxy and monosubstituted ethoxy groups within a polyoxyalkylene chain may be completely random and/or there may be blocks of ethoxy and/or monosubstituted ethoxy groups, and $R_3$ designates H or a monovalent organic radical selected from the group consisting of $C_1$ to $C_4$ aliphatic hydrocarbons.

Techniques to prepare suitable mono ethers of polyoxyalkylene diols are known in the art, and include reacting a hydroxyl group containing initiator with ethylene oxide and/or propylene oxide. The mono ether of polyoxyalkylene diol is reacted with a diisocyanate to form an isocyanate terminated adduct which is then hydrolyzed to obtain the suitable polyoxyalkyleneaminocarbamate.

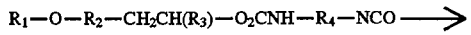

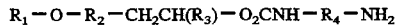

The mono ether of polyoxyalkylene diol and diisocyanate are reacted in the presence of catalysts such as organotin compounds and tertiary amines. This reaction can be performed with or without organic solvents. Suitable organic solvents are those containing no reactive groups which can react with isocyanate groups. Examples of suitable solvents are ketones, esters, aromatic hydrocarbons, ethers, etc. Preferred solvents are acetone, methylethylketone, methylisobutylketone, ethyl acetate, butyl acetate, toluene, xylene, and tetrahydrofuran. An excess of diisocyanate equal to or greater than two equivalents per equivalent of hydroxyl group is used. Due to bifunctional nature of the diisocyanate, in addition to the mono-adduct of diisocyanate, the reaction products also contain the bis-adduct of mono ether of polyoxyalkylene diol as well as reactants namely mono ether of polyoxylkylenediol and diisocyanate. However the reaction conditions chosen favor the formation of mono-adduct as major component of the product mixture.

The hydrolysis of isocyanate group containing mono-adduct is performed with water in the presence of a mineral acid such as hydrochloric acid. The acid salt of the amine terminated polyoxyalkyleneamine formed after hydrolysis is treated with a suitable base to generate the free amine form of the polyoxyalkyleneaminocarbamate.

Suitable diisocyanates for the preparation of adducts of mono ether of polyoxyalkylene diols include aliphatic, cycloaliphatic, or aromatic diisocyanates such as 1,6-hexamethylene diisocyanate, bis(4-isocyanatocyclohexyl)methane, isophoronediisocyanate, tolylenedissocyanate (available as mixture of 2,4- and 2,6-isomers) and meta-tetramethylxylenediisocyanate (m-TMXDI available from Cytec Industries).

The Polyepoxide

The polyepoxide reactant comprises one or more compounds each having a plurality of epoxide functional groups. The polyepoxide reactant has at least 2 epoxide groups present in the molecule, and may have as many as 6 epoxide groups present in the molecule. Techniques to prepare suitable polyepoxide compounds are known in the art, and include reacting compounds having a plurality of hydroxyl groups with epichlorohydrin in the presence of a suitable catalyst. Both aliphatic and aromatic polyepoxides are suitable for this invention.

Suitable aliphatic polyepoxide compounds are commercially available from Henkel Corporation, Ambler, Penn. under the trademarks "Capcures Reg.™" or "Photoreefs Reg.™"

One representative class of aliphatic polyepoxide reactant according to the invention has the structural formula:

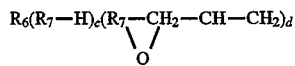

wherein $R_6$ designates a linear, branched or cyclic aliphatic or alicyclic organic radical having a valency equal to the sum of 'c' and 'd', where the sum of 'c' and 'd' is equal to or greater than 2 but no more than or equal to 6 and where 'd' is equal to or greater than 2 but less than or equal to 6. When the sum of 'c' and 'd' equals two (2), $R_6$ designates a linear, branched or cyclic aliphatic or alicyclic divalent organic radical having from 2 to 14 carbon atoms, and specifically includes the hydrocarbon portions of the dihydric alcohols ethylene glycol, butylene glycol, hexylene glycol, decanediol and dodecanediol which remain after the hydroxyl groups have been removed, and when the sum of 'c' and 'd' equals three (3), $R_6$ designates a linear, branched or cyclic aliphatic or alicyclic trivalent organic radical having from 3 to 14 carbon atoms, and specifically includes the hydrocarbon portions of the trihydric alcohols glycerol, 1,1,1-tris(hydroxymethyl)ethane, and 2-ethyl-2-(hydroxymethyl)-1,3-propanediol which remain after the hydroxyl groups have been removed, and when the sum of 'c' and 'd' equals four (4), $R_6$ designates a linear, branched or cyclic aliphatic or alicyclic tetravalent organic radical having from 5 to 30 carbon atoms, and specifically includes the hydrocarbon portion of the tetrahydric alcohol pentaerythritol which remains after the hydroxyl groups have been removed, and when the sum of 'c' and 'd' equals five (5), $R_6$ designates a linear, branched or cyclic aliphatic or alicyclic pentavalent organic radical having from 6 to 30 carbon atoms, and when the sum of 'c' and 'd' equals six (6), $R_6$ designates a linear, branched or cyclic aliphatic or alicyclic hexavalent organic radical having from 8 to 30 carbon atoms, and specifically includes the hydrocarbon portion of the hexahydric alcohol dipentaerythritol which remains after the hydroxyl groups have been removed, and $R_7$ represents a divalent polyoxyalkylene chain having the structural formula:

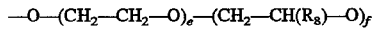

wherein $R_8$ is a monovalent organic radical selected from the group consisting of $C_1$ to $C_4$ aliphatic hydrocarbons, 'e' designates a number of ethoxy groups ($CH_2$—$CH_2$—O), 'f' designates a number of monosubstituted ethoxy groups ($CH_2$—$CH(R_8)$—O) where the substitution of one monosubstituted ethoxy group is independent from the substitution of any other monosubstituted ethoxy group in the polyoxyalkylene chain, the sum of 'e' and 'f' is equal to or greater than 0 but less than or equal to 10, and where the sequence of ethoxy and monosubstituted ethoxy groups within a polyoxyalkylene chain may be completely random and/or there may be blocks of ethoxy and/or monosubstituted ethoxy groups.

The most preferred aliphatic polyepoxide compound is the reaction product of pentaerythritol, propylene oxide and epichlorohydrin, having an epoxide equivalent weight (EEW) of about 230.

Suitable aromatic polyepoxides include epoxy novolac resins such as Araldite EPN 1138 and 1139, epoxy cresol novolac resins such as Araldite ECN 1235, 1273, 1280 and 1299, epoxy phenol novolac resins such as Araldite PV 720, epoxy resin 0510, Araldite MY 720 and 721, and Araldite PT 810 all of which are available from Ciba-Geigy. Tetrad C and Tetrad X resins available from Mitsubishi Gas Chemical Co. are also suitable for use in this invention.

The Epoxy Resin

The epoxy resin used in the practice of this invention comprises one or more polyglycidyl ethers of polyhydric phenols having two (2) or more epoxide groups and one (1) or more six-carbon aromatized rings present in the molecule, as represented by the structural formula:

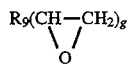

wherein

R$_9$ represents a 'g' valent C$_6$–C$_{50}$ organic radical comprising at least one six-carbon aromatized ring (e.g. when g is 2, R$_9$ can be —CH$_2$—O—∅—C(CH$_3$)$_2$—∅—O—CH$_2$— or R$_9$ can be —CH$_2$—O—∅—CH$_2$—∅—O—CH$_2$— wherein$_{13}$ ∅ represents a phenyl group), and 'g' is equal to or greater than 2 but less than or equal to 6.

Techniques to prepare such epoxy resins are known in the art, and include reacting compounds having 2 or more hydroxyl groups with epichlorohydrin in the presence of a suitable catalyst. Suitable epoxy resins are commercially available from a variety of sources and include EPON (Reg. ™) epoxy resins from Shell Chemical Company, Houston, Tx., and DER (Reg.™) or DEN (Reg.™) epoxy resins from Dow Chemical Company, Midland, Mich.

Examples of suitable epoxy resins are:

I) Polyglycidyl and poly(beta-methylglycidyl) esters obtainable by reacting a compound having at least two carboxy groups in the molecule with epichlorohydrin or beta-methyl-epichlorohydrin, respectively. The reaction is advantageously carried out in the presence of bases. Examples of aromatic polycarboxylic acids which may be used include, for example, phthalic acid, isophthalic acid or terephthalic acid.

II) Polyglycidyl or poly(beta-methylglycidyl) ethers obtainable by reacting a compound having at least two free phenolic hydroxy groups with epichlorohydrin or beta-methyl-epichlorohydrin, respectively, under alkaline conditions, or in the presence of an acid catalyst and with subsequent alkali treatment.

The epoxy compounds of this type may be derived from mononuclear phenols, such as, for example, resorcinol or hydroquinone; or they are based on polynuclear phenols, such as, for example, bis(4-hydroxyphenyl)methane, 4,4'-dihydroxybiphenyl, bis(4-hydroxyphenyl)sulfone, 1,1,2,2-tetrakis(4-hydroxyphenyl)ethane, 2,2-bis(4-hydroxyphenyl) propane, 2,2-bis(3,5-dibromo-4-hydroxyphenyl) propane, and from novolacs obtainable by condensation of aldehydes, such as formaldehyde, acetaldehyde, chloral or furfuraldehyde, with phenols, such as phenol, or with phenols that are substituted in the nucleus by halide atoms or C$_1$–C$_{18}$ (preferably C$_1$–C$_9$) alkyl groups, such as, for example, 4-chlorophenol, 2-methylphenol or 4-tert-butylphenol, or by condensation with bisphenols, in the manner described above.

There are preferably used epoxy resins that have an epoxy content of from 2 to 10 equivalents/mole and that are glycidyl ethers or glycidyl esters of aromatic or alkylaromatic compounds. Especially preferred epoxy resins are polyglycidyl ethers of bisphenols, such as, for example, of 2,2-bis(4-hydroxyphenyl)propane (bisphenol A) or bis(4-hydroxyphenyl)methane (bisphenol F), or novolacs formed by reacting formaldehyde with a phenol. For reasons of cost and availability, the most preferred epoxy resins are polyglycidyl ethers based on bisphenol A.

Preferred epoxy resins have an epoxide equivalent weight of less than about 400 grams/equivalent, e.g. from about 100 grams/equivalent to about 350 grams/equivalent, more preferably from about 150 grams/equivalent to about 225 grams/equivalent, e.g. DER 331 available from Dow Chemical at about 182 grams/equivalent.

The Polyhydric Phenol

The polyhydric phenol reactant comprises one or more compounds each having a plurality of hydroxyl groups covalently bonded to one or more six-carbon aromatized rings. The polyhydric phenol reactant may contain substituents such as alkyl, aryl, sulfido, sulfonyl, halo, and the like. The polyhydric phenol is represented by the structural formula:

wherein

R$_{10}$ represents an 'h' valent C$_6$–C$_{50}$ organic radical comprising at least one six-carbon aromatized ring, and 'h' represents a number of phenolic hydroxyl groups where 'h' is equal to or greater than 2 but less than or equal to 6.

Techniques to prepare suitable polyhydric phenol compounds are known in the art. Suitable polyhydric phenol compounds are commercially available from Dow Chemical Company, Midland Mich., and Shell Chemical Company, Houston, Tx.

Illustrative of suitable polyhydric phenols are 2,2-bis(4-hydroxyphenyl)propane, 2,2-bis(3-bromo-4-hydroxyphenyl)-propane, 2,2-bis(3,5-dichloro-4-hydroxyphenyl)propane, 2,2-bis(3-chloro-4-hydroxyphenyl)propane, bis(4-hydroxyphenyl)-methane, bis(4-hydroxyphenyl)sulfone, bis(4-hydroxyphenyl)sulfide, resorcinol, hydroquinone, phenol-formaldehyde novolac resins, and the like. The most preferred dihydric phenols are 2,2-bis(4-hydroxyphenyl)propane (bisphenol A) and bis(4-hydroxyphenyl)methane (bisphenol F) for reasons of cost and availability.

The Amine-Epoxy Adduct

The preparation of certain of the self-dispersing curable epoxy resins of the invention proceeds through an amine-epoxy adduct, where the amine-epoxy adduct is subsequently reacted with an epoxy resin and, optionally, a polyhydric phenol. The structure of the amine-epoxy adduct is dependent on the structures of the polyoxyalkyleneaminocarbamate and the polyepoxide used in the preparation of the amine-epoxy adduct, as well as the relative ratio of the reactants.

An adduct formed by reacting 1.0 equivalents of an aliphatic polyepoxide and from about 0.3 to 0.9 reactive equivalents, preferably from about 0.6 and 0.8 reactive equivalents of a polyoxyalkyleneaminocarbamate will produce compounds having the structural formula:

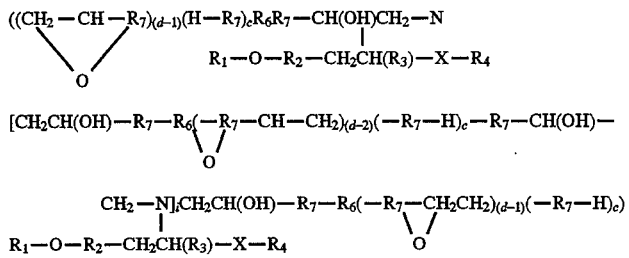

wherein
'i' indicates a number of repetitive units where 'i' is equal to or greater than zero (0) but less than or equal to about fifty.

If the adduct is formed by reacting 1.0 equivalents of an aliphatic polyepoxide with from greater than about 1.0 equivalents (preferably from about 1.01 to about 2.5) reactive equivalents of a polyoxyalkyleneaminocarbamate, the adduct will have the structural formula:

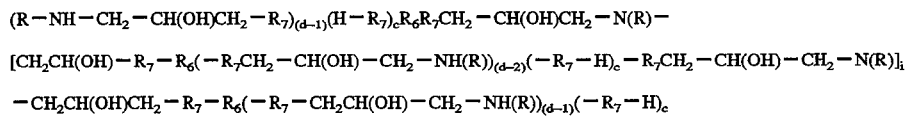

wherein
'i' indicates a number of repetitive units where 'i' is equal to or greater than zero (0) but less than or equal to about fifty, typically from about 10 to about 20. R is $R_1$—O—$R_2$—$CH_2CH(R_3)$—X—$R_4$.

The Self-Dispersing Curable Epoxy Resin

Certain of the self-dispersing curable epoxy resins of the invention are prepared by reacting an amine-epoxy adduct with a polyhydric phenol and an epoxy resin. The structure

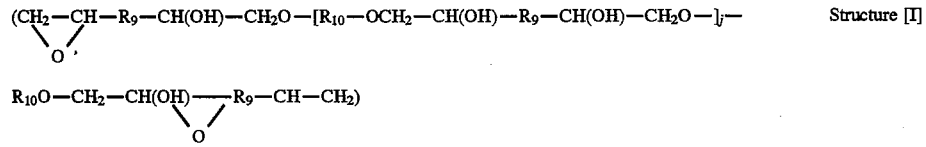

Structure [I]

and composition of the self-dispersing curable epoxy resin will depend on the identity of the amine-epoxy adduct, the identity of the epoxy resin, the identity of the polyhydric phenol and the relative ratio of the reactants. In certain embodiments, the amine-epoxy adduct is the reaction product of (a) 1.0 reactive equivalents of an epoxy resin, (b) from about 0.01 to 1.0 reactive equivalents, preferably from about 0.4 to 0.6 reactive equivalents of a polyhydric phenol, and (c) from about 0.005 to 0.5 reactive equivalents (typically from about 0.005 to 0.05 reactive equivalents, more typically from about 0.005 to 0.025 reactive equivalents, and preferably from about 0.005 to 0.015 reactive equivalents) of the polyoxyalkyleneaminocarbamate.

The products of the above reaction are envisioned to be an extremely complex mixture of polymeric materials comprising two distinct groups. The products of the above reaction are envisioned to be an extremely complex mixture of polymeric materials comprising two distinct groups. A simplified structure for each group of reaction products can be shown if it is assumed that the phenolic component is dihydric and the epoxy component is a diepoxide.

wherein
'j' indicates a number of repeating units, and is equal to or greater than zero (0) but less than or equal to twenty (20).

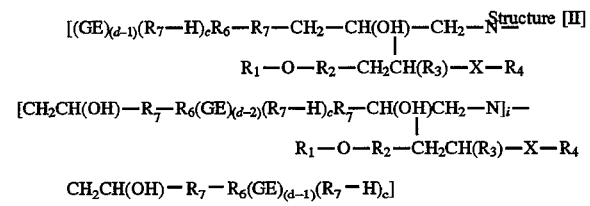

Structure [II]

wherein
'GE' is defined as

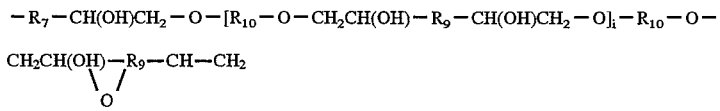

and all other variables are as defined above.

Organic Cosolvents

The self-dispersing curable epoxy resin of the present invention may be combined with a non-reactive, organic cosolvent. The cosolvent serves to reduce the viscosity of the self-dispersing curable epoxy resin. Preferred organic cosolvents include the alkyl ethers of monohydric and dihydric alcohols, where the alkyl group comprises $C_1$–$C_8$ linear or branched aliphatic or alicyclic chains. The choice of cosolvent can affect the pot-life of the self-dispersing curable epoxy resin. For example, for a given resin it may be possible to increase the pot-life by substituting for a cosolvent such as Extra solve EP (Eastman Chemicals) with one of the following cosolvents (the greater increase being obtained in order): 1-methoxy-2-propyl acetate, methyl n-amyl ketone, or dipropylene glycol n-butyl ether.

Reactive Diluents

The preferred stable aqueous epoxy resin dispersions of the present invention are those which contain a water-immiscible $C_8$–$C_{20}$ aliphatic monoepoxide reactive diluent. The said monoepoxide component can contain aft cyclic and aromatic structures, as well as halogen, sulfur, phosphorus, and other such heteroatoms. Suitable reactive diluents are available from CVC Specialty Chemicals, Inc., Cherry Hill, N.J.

Illustrative of monoepoxide reactive diluents are epoxidized unsaturated hydrocarbons such as decene and cyclohexene; glycidyl ethers of monohydric alcohols such as 2-ethylhexanol, dodecanol and eicosanol; glycidyl esters of monocarboxylic acids such as hexanoic acid; acetals of glycidaldehyde; and the like. The preferred reactive diluent is glycidyl ether of monohydric $C_8$–$C_{10}$ aliphatic alcohols.

The presence of a water-immiscible $C_8$–$C_{20}$ aliphatic monoepoxide reactive diluent in an aqueous epoxy resin dispersion has significant beneficial effects in addition to modifying the viscosity of the dispersion. For example, the said water-immiscible reactive diluent appears to coat the particles of epoxy resin solids and thereby provide the aqueous dispersion with improved shear, freeze-thaw resistance, shelf viscosity stability, and paint gloss.

Also, since the reactive diluent is epoxy functional, it becomes chemically bonded into the film which is formed during the subsequent room temperature curing of the aqueous dispersion composition after it has been blended with a curing agent and coated on a surface. The total quantity of reactive diluent contributes to the calculated proportion of non-volatiles in the dispersion composition.

Preparation of the Self-Dispersing Curable Epoxy Resin

In preparing certain of the self-dispersing curable epoxy resins of this invention, an amine-epoxy adduct is first prepared by combining the polyoxyalkyleneaminocarbamate reactant and the polyepoxide reactant, heating the mixture slowly to about 130° C., holding the mixture at temperature for about 2.5 hours, and then discharging the amine-epoxy adduct from the reactor. The respective self-dispersing epoxy resin is prepared by combining the amine-epoxy adduct, the polyhydric phenol and the epoxy resin, and heating the mixture in the presence of a catalyst, e.g., potassium hydroxide, triphenyl phosphine, benzyl dimethylamine and the like, to a temperature of about 150_° C. with stirring. An exothermic reaction will then occur, and cooling is applied to maintain the reaction temperature at about 150°–160° C. The mixture is maintained at about 160° C. for about one hour subsequent to the conclusion of the exothermic reaction. If the reaction has not progressed to the desired degree of completion (as determined by the epoxide equivalent weight of the reaction product) the mixture is then heated to 190° C. The reaction is maintained at 190° C. for about 15 minutes in order to drive the reaction to completion, then cooled to about 160° C. whereupon a small amount of organic solvent is added prior to cooling and discharging the self-dispersing curable epoxy resin from the reactor.

In certain embodiments, the polyoxyalkyleneamine is reacted directly with the epoxy resin to prepare a self-dispersing curable epoxy resin. The conditions employed for such a reaction may be the similar to the conditions under which the amine-epoxy adduct is formed.

Preparation of an Aqueous Dispersion of the Self-Dispersing Curable Epoxy Resin

The aqueous epoxy dispersion of the invention is prepared by charging the self-dispersing curable epoxy resin, as a mixture with a organic cosolvent, to a reaction vessel, then heating the resin to about 50°–100° C. with stirring. Water is then mixed with the mixture of organic cosolvent and self-dispersing curable epoxy resin to form an aqueous pre-emulsion which will typically be a disperse oil phase having a larger particle size.

The particle size of the oil phase in the aqueous dispersion can be modified by physical techniques to reduce the particle size. The particle size reduction is preferably accomplished by subjecting the aqueous dispersion to high shear, e.g. in a homogenizer such as that disclosed in U.S. Pat. No. 4,533,254 (Cook et al.), the disclosure of which is incorporated herein be reference, and commercially available as MICROFLUIDIZER™ from Micrefluidics Corporation, Newton, Mass. Homogenizers as well as other equipment suitable for making aqueous dispersion of epoxy resins are discussed in W. C. Griffin, "Emulsions", *Encyclopedia of Chemical Technology*, Vol. 8, pp. 900–930 (Kirk-Othmer, eds., John Wiley & Sons, Inc., New York, N.Y., 3d ed., 1979), the disclosure of which is incorporated herein by reference. High shear mixers suitable for reducing particle size are further described in Wicks, Z. W., Jr., Jones, F. N., Pappas, S. P., *Organic Coatings: Science and Technology*, Volume II, Application, *Properties and Performance*, John Wiley & Sons, Inc., New York, 1994, pp. 42–45, the disclosure of which is incorporated herein by reference.

After reduction of the particle size, at least a portion of the organic cosolvent is removed. The organic cosolvent is removed by volatilizing the same from the mixture. This is an evaporative process that may be considered a distillation. Sufficient organic cosolvent should be removed so that the aqueous dispersion will be low in volatile organic compounds, and preferably essentially free of such compounds.

The removal of the organic cosolvent will be facilitated by subjecting an agitated dispersion to elevated temperatures and/or reduced pressures, e.g. a vacuum distillation. The precise temperature and pressure employed to effect removal of the organic cosolvent will, of course, depend upon the volatility of the organic cosolvent chosen, but temperatures that will cause degradation or polymerization of the resin should be avoided. Distillation is discussed in E. Hafslund, "Distillation", *Encyclopedia of Chemical Technology*, vol. 7, pp. 849–891 (Kirk-Othmer, eds. John Wiley & Sons, New York, 3d ed. 1979) and evaporation is discussed in F. Standiford, "Evaporation", *Encyclopedia of Chemical Technology*, vol. 9, pp. 472–493 (Kirk-Othmer, eds. John Wiley & Sons, New York, 3d ed. 1980), the disclosures of which are incorporated by reference.

The aqueous dispersion of self-dispersing resin will typically exhibit excellent chemical and physical stability over an extended shelf-life, e.g. of from five to six months. As an example of the chemical stability, the epoxide equivalent weight (EEW) of the aqueous dispersion of self-dispersing resin should remain essentially constant, e.g. should show no trend of increasing molecular weight, over a period of at least one month from the preparation of the aqueous dispersion.

Epoxide equivalent weight can be determined by differential titration with perchloric acid using crystal violet as an indicator (e.g. a first sample is titrated with 0.1N perchloric acid to an endpoint that shows the first sight of green color from the crystal violet indicator, the amine equivalent weight of the dispersion is calculated from this titration, a second sample is mixed with excess tetraethylammonium bromide and titrated with 0.1N perchloric acid to a green endpoint that persists for at least 30 seconds, total epoxide and amine equivalents are calculated from this titration, and the epoxide equivalent weight is calculated as the difference).

As an example of physical stability, the resin should not display layer formation for a period of at least one month from the preparation of the aqueous dispersion, i.e. there should be no formation of a macro-observable water phase as a layer separate from the dispersed resin phase.

Coating Compositions Comprising an Aqueous Dispersion of the Self-Dispersing Curable Epoxy Resin The coating composition of the invention is prepared by combining the aqueous epoxy dispersion with a suitable hardening agent. The coatings are tack free after 45 minutes and have excellent film properties. An aqueous epoxy resin paint composition of the present invention may further contain additives conventionally employed in coating technology, such as organic pigments, inorganic pigments, surfactants, thickeners, and the like.

A room temperature curable water-borne coating composition is prepared by admixing a stable epoxy dispersion composition as described above with an epoxy-interacting curing vehicle, such as a polyamine curing agent. The ratio of active amino hydrogens to epoxy groups in the admixture is in the range of from 0.5:1 to 2:1 and, preferably, is in the range between about 0.8:1 to 1.5:1. For purposes of industrial maintenance paint compositions, the amino hydrogens must be sufficiently reactive to effect crosslinking interaction with the epoxy groups at ambient temperatures.

Suitable polyamine curing agents are those which are soluble or dispersible in water and which contain more than 2 active hydrogen atoms per molecule. Examples of such curing agents are alkylene polyamines represented by the formula:

wherein

'T' is an alkylene radical containing 2 to 6 carbon atoms and 'u' is equal to or greater than zero (0) but less than or equal to five (5). Such alkylene polyamines include ethylene diamine, diethylene triamine, triethylene tetramine, tetraethylene pentamine, pentaethylene hexamine, propylene diamine, dibutylene triamine, hexamethylene aliamine, and the like.

Other polyamine curing agents that can be employed in the practice of this invention are the polyamido amines, which are reaction products of alkylene polyamines and fatty acids. Such polyamidoamines are well known in the art and are described in U.S. Pat. Nos. 2,705,223, 2,811,495 and 2,899,397, which patents are hereby incorporated by reference. Other polyamine curing agents are the adducts of polyamines and epoxy compounds such as those described in U.S. Pat. Nos. 2,651,589, 2,864,775 and 4,116,900, which patents are hereby incorporated by reference.

Examples of useful curing agents also include those disclosed in U.S. patent application Ser. No. 08/085,861, These epoxy curing agents comprise the reaction product of reactants consisting essentially of an alkylene polyamine having less than about 12 carbon atoms, an aromatic monoglycidyl ether having less than about 18 carbon atoms, and a diglycidyl ether of an aromatic diol having an average degree of oligomerization of less than about 3.5, wherein the ratio of primary amine equivalents of said alkylene polyamine to the total epoxide equivalents of said aromatic glycidyl ether and said diglycidyl ether of an aromatic diol is not essentially less than one, and the ratio of epoxide equivalents of said aromatic mono-glycidyl ether to epoxide equivalents of said diglycidyl ether of an aromatic diol is greater than one.

In addition to the amine curing agent, a curing accelerator can be included in the coating composition. Such an accelerator will serve to reduce the time for the coating to become tack-free. Useful accelerators for amine curing agents include tertiary amines, e.g. N, N'-bis(dimethyl-aminopropyl) urea.

Other curing agents can be used in the composition of this invention, particularly when the coatings made from the compositions are heated to effect a cure. Examples of such additional curing agents are the aminoplast and phenolplast resins. Suitable aminoplast resins are the reaction products of ureas and melamines with aldehydes further etherified in some cases with an alcohol. Examples of aminoplast resin components are urea, ethylene urea, thiourea, melamines, benzoguanamine and acetoguanamine. Aldehydes include formaldehyde, acetaldehyde and propionaldehyde. The aminoplast resins can be used in the alkylol form but, preferably, are utilized in the ether form wherein the etherifying agent is a monohydric alcohol containing from 1 to 8 carbon atoms. Examples of suitable aminoplast resins are methylol urea, dimethoxymethylol urea, butylated polymeric urea-formaldehyde resins, hexamethoxymethyl melamine, methylated polymeric melamine-formaldehyde resins and butylated polymeric melamine-formaldehyde resins.

Phenolplast resins are the reaction products of phenols and aldehydes which contain reactive methylol groups. These compositions can be monomeric or polymeric in nature depending on the molar ratio of phenol to aldehyde used in the initial condensation reaction. Examples of suitable phenols are phenol, o, m or p-cresol, 2,4-xylenol, 3,4-xylenol, 2,5-xylenol, cardanol, p-tert-butyl phenol, and the like. Useful aldehydes are formaldehyde, acetaldehyde and propionaldehyde. Particularly useful phenolplast resins are polymethylol phenols wherein the phenolic group is etherified with an alkyl, e.g., methyl or ethyl, group.

Other epoxy resin curing agents may also be useful, e.g. catalytic curing agents: Lewis bases (such as tertiary amines), Lewis acids (such as boron trifluoride), cationic curing agents (such as aryldiazonium salts, diaryliodinium salts, onium salts of Group VIa elements, especially sulfur) and reactive curing agents: mercaptans, isocyanates, carboxylic acids, and acid anhydrides. Curing agents for epoxy resins in general are discussed in the *Encyclopedia of Polymer Science and Engineering*, vol. 6, pp. 340–361 (John Wiley & Sons, Inc., New York, N.Y., 1986), the disclosure of which is incorporated by reference.

The following examples are further illustrative of the present invention. The reactants and other specific ingredients are presented as being typical, and various modifications can be derived in view of the foregoing disclosure within the scope of the invention.

EXAMPLES

Example 1

Polyoxyalkyleneaminocarbamate from Poly(ethylene glycol) Monomethyl Ether of molecular weight 550 (PEGMME-550) and Tolylenediisocyanate (TDI).

A suitable reaction set-up consists of a four-neck round-bottom flask equipped with stirrer, condenser, heating mantle with means to monitor and control temperature such as Jack-o-matic™ with on-off controller, addition funnel and means for maintaining nitrogen atmosphere. The reaction flask is charged with 55 g (0.1 mole) of PEGMME-550, (available from Polysciences, Inc., Warrington, Penn. dried by vacuum distillation or with suitable drying agents to remove water if necessary) and 0.2 g of dibutyl tin dilaurate (Aldrich Chemical Co.). Stirring is started and addition of 17.4 g of Mondur TDS (TDI, available from Miles, 0.1 mole) is made dropwise over 1 h. An increase in temperature is observed and cooling is applied to the reaction flask if necessary to keep the temperature below 65±5 C. After addition of Mondur TDS is complete reaction is continued at 65±5 C. until isocyanate value of the reaction mixture is determined to be 6.1±0.6% by weight (determined by titration per ASTM D-2572-87). Heating is stopped and reaction mixture is cooled with ice-water bath and 125 ml of 8N hydrochloric acid is added slowly, with stirring. The cooling bath is removed and the reaction mixture is heated on a steam bath with stirring until evolution of carbon dioxide is stopped. The reaction mixture is refluxed for 10 minutes and then allowed to cool. Addition of 2N sodium hydroxide is made with cooling to a pH of 12. The reaction mixture is extracted with three 250 ml portion of diethyl ether, the ether extracts are dried with anhydrous magnesium sulfate and then subjected to rotary evaporation to obtain the polyoxyalkyleneaminocarbamate with a calculated amine value of 1.43±0.2 milliequiv./g.

Example 2

Polyoxyalkyleneaminocarbamate from PEGMME-1900 and TDI.

This polyoxyalkyleneamine is prepared in a manner similar to that of Example 1 except 190 g of poly(ethylene glycol) monomethyl ether of molecular weight 1900 (available from Polysciences, Inc.) is used. Calculated amine value of this polyoxyalkyleneamine is 0.49±0.1 milliequiv./g.

Example 3

Polyoxyalkyleneamine from PEGMME-550 and Isophoronediisocyanate (IPDI).

This polyoxyalkyleneamine is prepared similar to that of example 1 except 22.2 g (0.1 mole) of isophorone diisocyanate (Vestanat IPDI, Huels America) is used in place of TDI. Calculated amine value of this polyoxyalkyleneamine is 1.34±0.2 milliequiv./g.

Example 4

Polyoxyalkyleneaminocarbamate from PEGMME-1900 and IPDI.

This polyoxyalkyleneaminocarbamate is prepared similar to that of Example 2 except 22.2 g IPDI is used in place of TDI. Calculated amine value of this polyoxyalkyleneamine is 0.48±0.1 milliequiv./g.

Example 5

Epoxy Functional Dispersant from Poloxyalkyleneaminocarbamate of Example 1.

Reaction set-up for this example is similar to that for Example 1. Reaction flask is charged with 48.3 g of the polyoxyalkyleneaminocarbamate of Example 1 and 51.7 g Capcure 711 (multifunctional polyglycidyl ether of EEW 230 available from Henkel Corporation) at room temperature with stirring under an atmosphere of nitrogen. The reaction mixture is heated to 125±5 C. with stirring and held at this temperature until EEW of the reaction mixture is determined to be 1080±200 (determined by titration with perchloric acid per ASTM D-1652-88, a correction is needed for the presence of amine groups in the polyoxyalkyleneamine). Heating is stopped and the product is discharged.

Example 6

Self-dispersible Epoxy Resin of EEW 550 from the Dispersant of Example 5.

Reaction set-up for this example is similar to that for Example 1. Reaction flask is charged with 245 g dispersant of Example 5, 593 g D.E.R. 331 (epoxy resin of EEW 195 available from Dow Chemical Co.), 62 g BPA-157 (bisphenol A available from Shell Chemical Co.) and 1 g ethyltriphenylphosphonium iodide (ETPPI) under an atmosphere of nitrogen. Stirring is started and the reaction mixture is heated slowly to 60±5 C. An exothermic reaction takes place and cooling is applied if necessary to maintain reaction temperature in this range. Reaction is continued until EEW of the product is determined to be 550±50 (titration with perchloric acid per ASTM D-1652-88, corrected for amine value). Heating is stopped and addition of 110 g ethylene glycol propyl ether (Ektasolve EP, Eastman Chemical Co.) is made slowly. After addition of solvent is complete and reaction temperature is 90±5 C., addition of 213 g of de-ionized water is made slowly. Heating is applied if necessary so that the reaction temperature does not fall below 75±5 C. at the completion of water addition. After water has been added and mixed in, the reaction temperature is allowed to drop to 50±5 C. and then the sample is tested for inversion from water-in-oil to oil-in-water phase. This is evident when a small amount of the product is found to mix readily with water. After inversion addition of 496 g of de-ionized water is made slowly with stirring at 50±5 C. and then the product is cooled to below 40 C. and discharged. A dispersion with calculated solids of 55% is obtained in this manner which can be used for the formulation of coatings described below.

Example 7

Self-dispersible Epoxy Resin with EEW 1800 from the Dispersant of Example 5.

Reaction set-up for this example is similar to that for Example 1. Reaction flask is charged with 216 g dispersant of Example 5, 523 g D.E.R. 331 (epoxy resin of EEW 195 available from Dow Chemical Co.), 261 g of BPA-157 (bis-phenol A available from Shell Chemical Co.) and 1 g ETPPI under an atmosphere of nitrogen. Stirring is started and the reaction mixture is heated slowly to 160±5 C. An exothermic reaction takes place and cooling is applied if necessary to maintain reaction temperature in this range. Reaction is continued until EEW of the product is determined to be 1800±200 (titratiolth perchloric acid per ASTM D-1652-88, corrected for amine value). Heating is stopped and addition of 250 g ethylene glycol propyl ether (Ektasolve EP, Eastman Chemical Co.) is made slowly. After addition of solvent is complete and reaction temperature is 90±5 C., addition of 171 g of de-ionized water is made slowly. Heating is applied if necessary so that the reaction temperature does not fall below 65±5 C. at the completion of water addition. After water has been added and mixed in, the reaction temperature is allowed to drop to 50±5 C. and then the sample is tested for inversion from water-in-oil to oil-in-water phase. This is evident when a small amount of the product is found to mix readily with water. After inversion addition of 398 g of de-ionized water is made slowly with stirring at 50±5 C. and then the product is cooled to below 40 C. and discharged. A dispersion with calculated solids of 55% is obtained in this manner which can be used for the formulation of coatings and described below.

Example 8

Epoxy Functional Dispersant from the Polyoxyalkyleneaminocarbamate of Example 2.

Preparation of this dispersant is made similar to that of Example 5 using 73.2 g of the polyoxyalkyleneaminocarbamate of Example 2 and 26.8 g Capcure 711. This polyoxyalkyleneamine has EEW of 2100±400 (after correction for amine value).

Example 9

Self-dispersible Epoxy Resin of EEW 550 from the Dispersant of Example 8.

This epoxy resin is prepared similar to that of Example 6 using 151 g dispersant of Example 8, 655 g D.E.R. 331, 194 g BPA-157 and 1 g ETPPI. Amounts of solvent and water are similar to those of Example 6.

Example 10

Preparation of a Self-dispersible Epoxy Resin of EEW 1800 from the Dispersant of Example 8.

This epoxy resin is prepared similar to that of Example 7 using 100 g dispersant of Example 8, 603 g D.E.R. 331, 296 g BPA-157 and 1 g ETPPI. Amounts of solvent and water are similar to those used in Example 7.

Example 11

Epoxy Functional Dispersant from Polyoxyalkyleneaminocarbamate of Example 3.

Preparation of this dispersant is similar to that of Example 5 using 49.9 g Capcure 711 and 50.1 g polyoxyalkyleneaminocarbamate of Example 3. EEW of reaction product is 1120±200 (after correction for amine value).

Example 12

Self-dispersible Epoxy Resin of EEW 550 from Dispersant of Example 11.

The epoxy resin is prepared similar to that of Example 6 using 251 g dispersant of Example 11, 588 g D.E.R. 331, 161 g BPA-157 and 1 g ETPPI. Amounts of solvent and water are similar to those used in Example 6.

Example 13

5 Self-dispersible Epoxy Resin of EEW 1800 from Dispersant of Example 11.

This epoxy resin is prepared similar to that of Example 7 using 221 g Dispersant of Example 11, 519 g D.E.R. 331, 259 g BPA-157 and 1 g ETPPI. Amounts of solvent and water are similar to those used for Example 7.

Example 14

Epoxy Functional Dispersant from Polyoxyalkyleneaminocarbamate of Example 4.

Preparation of this dispersant is made similar to that for Example 5 using 26.4 g Capcure 711 and 73.6 g polyoxyalkyleneamine of Example 4. EEW of the dispersant is 2100±400.

Example 15

Self-dispersible Epoxy Resin of EEW 550 from Dispersant of Example 14.

The epoxy resin is prepared similar to that of Example 6 using 153 g dispersant of Example 14, 654 g D.E.R. 331, 193 g BPA-157 and 1 g ETPPI. Amounts of solvent and water are similar to those for Example 6.

Example 16

Self-dispersible Epoxy Resin of EEW 1800 from Dispersant of Example 14.

This epoxy resin is prepared similar to that of Example 7 using 102 g dispersant of Example 14, 603 g D.E.R. 331, 296 g BPA-157 and 1 g ETPPI. Amounts of solvent and water are similar to those for Example 7.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

We claim:

1. A self-dispersing curable epoxy resin composition comprising the addition product of reactants comprising (a) 1.0 reactive equivalent of an epoxy resin, (b) from about 0.40 to 0.95 reactive equivalents of a polyhydric phenol, and (c) from about 0.005 to 0.5 reactive equivalents of an amine-epoxy adduct comprising the addition product of reactants comprising 1.0 reactive equivalent of a polyepoxide and from about 0.3 to 0.9 reactive equivalents of a polyoxyalkyleneaminocarbamate having the structural formula:

$$R_1-O-R_2-CH_2CH(R_3)-X-R_4-NH_2$$

wherein:

$R_1$ designates a monovalent organic radical selected from the group consisting of $C_1$ to $C_2$ aliphatic, alicyclic or aromatic hydrocarbons, and R$_2$ represents a polyoxyalkylene chain having the structural formula:

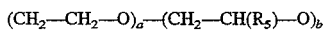

wherein:
R$_5$ is a monovalent organic radical selected from the group consisting of C$_1$ to C$_4$ aliphatic hydrocarbons,
'a' designates a number of ethoxy groups (CH$_2$—CH$_2$—O),
'b' designates a number of monosubstituted ethoxy groups (CH$_2$—CH(R$_5$)O) where the substitution of one monosubstituted ethoxy group is independent from the substitution of any other monosubstituted ethoxy group in the polyoxyalkylene chain, the sum of 'a' and 'b' is equal to or greater than 10 but less than or equal to 200, and where the sequence of ethoxy and monosubstituted ethoxy groups within a polyoxyalkylene chain may be completely random and/or there may be blocks of ethoxy and/or monosubstituted ethoxy groups, and
R$_3$ designates H or a monovalent organic radical selected from the group consisting of C$_1$ to C$_4$ aliphatic hydrocarbons.
R$_4$ designates aliphatic, cycloaliphatic or aromatic radical containing 6 to 18 carbon atoms and X is OC(O)NH.

2. A composition as claimed in claim 1 wherein said epoxy resin has an epoxide equivalent weight of less than about 400 grams/equivalent.

3. A composition as claimed in claim 1 wherein said epoxy resin has an epoxide equivalent weight of from about 100 grams/equivalent to about 350 grams/equivalent.

4. A composition as claimed in claim 1 wherein said epoxy resin has an epoxide equivalent weight of from about 150 grams/equivalent to about 225 grams/equivalent.

5. A composition as claimed in claim 1 wherein said polyhydric phenol is present in a ratio of from about 0.45 to about 0.90 reactive equivalents to said 1.0 reactive equivalents of said epoxy resin.

6. A composition as claimed in claim 1 wherein said polyoxyalkyleneaminocarbamate is comprised predominantly of ethyleneoxy groups.

7. A composition as claimed in claim 1 wherein from about 70% to about 95% by weight of the oxyalkylene groups of said polyoxy-alkyleneaminocarbamate are ethyleneoxy groups.

8. A composition as claimed in claim 1 further comprising between about 20–80 weight percent of a solvent phase comprising between 50 and 100 weight percent water and between 0 and 50 weight percent of organic cosolvent, and about 80–20 weight percent of said self-dispersing curable epoxy dispersion composition.

9. A composition as claimed in claim 1 wherein 0.005 to 0.025 reactive equivalents of said amine-epoxy adduct are reacted per equivalent of said epoxy resin.

10. A composition as claimed in claim 1 wherein 0.005 to 0.015 reactive equivalents of said amine-epoxy adduct are reacted per equivalent of said epoxy resin.

11. A self-dispersing curable epoxy resin composition prepared by the process of reacting (a) 1.0 reactive equivalents of an epoxy resin, (b) from about 0.01 to 1.0 reactive equivalents of a polyhydric phenol, and (c) from about 0.005 to 0.5 reactive equivalents of an amine-epoxy adduct comprising the addition product of reactants comprising 1.0 reactive equivalent of a polyepoxide and from about 0.3 to 0.9 reactive equivalents of a polyoxyalkyleneaminocarbamate as defined in claim 1.

12. An aqueous dispersion comprising a self-dispersing epoxy resin, wherein the self-dispersing epoxy resin is prepared by the steps comprising:

(a) preparing an amine-epoxy adduct by contacting a polyoxyalkyleneaminocarbamate, as defined in claim 1 and a polyepoxide, where the ratio of the reactive equivalents of the polyoxyalkyleneaminocarbamate and the polyepoxide is in the range from about 0.3:1 to 0.9:1, and (b) contacting the amine-epoxy adduct with a polyhydric phenol and an epoxy resin wherein the epoxy resin comprises a polyglycidyl ether of a polyhydric phenol, where the ratio of the reactive equivalents of the polyhydric phenol to the reactive equivalents of the polyglycidyl ether of a polyhydric phenol is in the range from about 0.40:1 to about 0.95:1, and where the ratio of the reactive equivalents of the amine-epoxy adduct to the reactive equivalents of the polyglycidyl ether of the polyhydric phenol is in the range from about 0.005:1 to about 0.5:1.

13. A composition as claimed in claim 12 further comprising (1) between about 20–80 weight percent of a solvent phase comprising between 50 and 100 weight percent water and between 0 and 50 weight percent of organic cosolvent, and about 80–20 weight percent of said self-dispersing curable epoxy dispersion composition.

14. A coating composition comprising a cured self-dispersing epoxy resin as defined in claim 1.

15. A self-dispersing curable epoxy resin composition comprising the addition product of reactants comprising:

(a) 1.0 reactive equivalent of an epoxy resin;

(b) from about 0.005 to 0.5 reactive equivalents of the addition product of 1.0 reactive equivalent of a polyepoxide and greater than 1 but not more than about 2.5 reactive equivalents of the polyoxyalkyleneaminocarbamate of claim 1; and (c) from about 0.01 to 1.0 reactive equivalents of a polyhydric phenol.

16. A self-dispersing curable epoxy resin composition prepared by a process which comprises: reacting (a) 1.0 reactive equivalent of an epoxy resin;

(b) from about 0.005 to 0.5 reactive equivalents of an amine-epox adduct comprising the addition product of 1.0 reactive equivalents of a polyepoxide and from greater than 1 to not more than about 2.5 reactive equivalents of the polyoxyalkyleneaminocarbamate of claim 1 and (c) from about 0.01 to about 1.0 reactive equivalents of a polyhydric phenol.

17. An aqueous dispersion comprising a self-dispersing epoxy resin prepared by the steps comprising:

(a) preparing a mixture of the self dispersing curable epoxy resin composition as defined in claim 1, water and an organic cosolvent, (b) reducing the particle size of the mixture, and (c) removing at least a major amount of said organic cosolvent from said mixture after said reducing.

18. An aqueous dispersion comprising a self-dispersing epoxy resin prepared by the process comprising:

(a) preparing an amine-epoxy adduct by reacting a polyoxalkyleneaminocarbamate and a polyepoxide wherein the reactive equivalents of the polyoxyalkyleneaminocarbamate and the polyepoxide is above 1.0:1 and not greater than about 2.5:1;

(b) contacting the amine-epoxy adduct with a polyglyciyl ether of a polyhydric phenol and a polyhydric phenol, wherein the ratio of the reactive equivalents of the amine-epoxy adduct to the reactive equivalents of the polyhydric ether of the polyhydric phenol is from 0.005:1 to about 0.5:1 and the ratio of the reactive equivalents of the polyhydric phenol and the polyglycidyl ether of a polyhydric phenol is from about 0.01:1 to about 1.0:1.

19. A stable dispersion of the composition as defined in claim 18 comprising (1) between about 20–80 weight percent of a solvent phase comprising between 50 and 100 weight percent water and between 0 and 50 weight percent of organic cosolvent, and (2) between about 80–20 weight percent of the self-dispersing curable epoxy resin.

\* \* \* \* \*